Patented May 3, 1927.

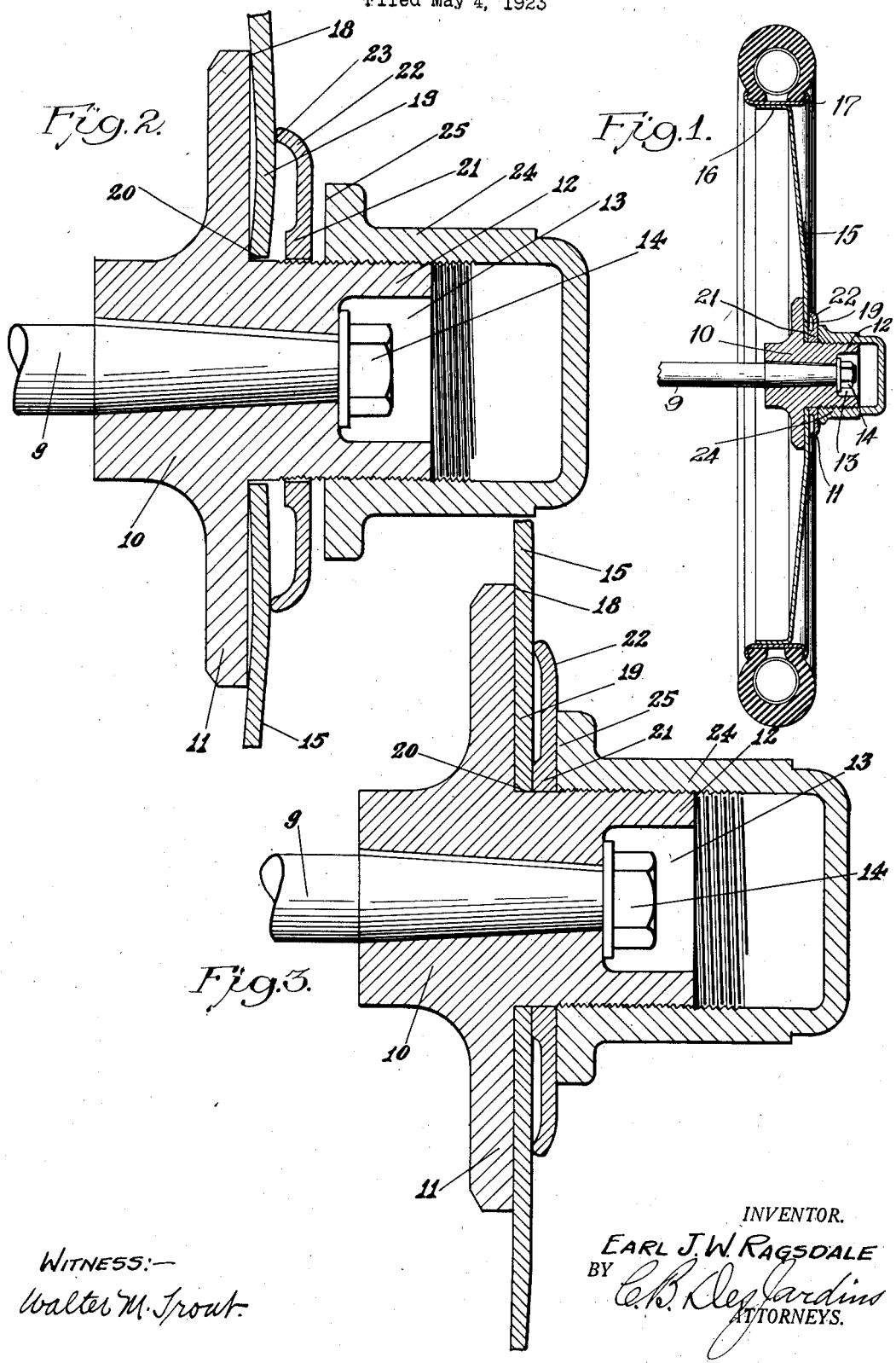

1,627,202

UNITED STATES PATENT OFFICE.

EARL J. W. RAGSDALE, OF NORRISTOWN, PENNSYLVANIA, ASSIGNOR TO BUDD WHEEL COMPANY, OF PHILADELPHIA, PENNSYLVANIA, A CORPORATION OF PENNSYLVANIA.

WHEEL.

Application filed May 4, 1923. Serial No. 636,537.

My invention relates to improvements in wheels and has to do, more particularly, with demountable disc wheels for automobiles. This application is a continuation, in part, of my pending application for improvements in wheels, Serial No. 568,838, June 16, 1922.

The principal object of my invention is to provide a simple, efficient and inexpensive disc wheel construction in which the wheel disc or body is removable from the hub and can be very quickly and easily locked in fixed relation thereto.

Another object of my invention is to provide a simple and easily manufactured clutch construction for releasably connecting the body of a disc wheel to the hub.

Another object of my invention is to provide a simple construction by means of which the removable wheel disc of a disc wheel may be securely clamped or locked to the hub, said construction involving only a few simple parts and permitting the quick and easy release of the wheel disc when it is desired to remove it from the hub.

Further objects, and objects relating to details and economies of construction and operation, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawings, forming a part of this specification, in which:

Fig. 1 is a sectional view of a disc wheel embodying my invention, the section being taken through the axle.

Fig. 2 is an enlarged view corresponding to the central part of Fig. 1, the parts being shown in their normal position before being placed under stress by screwing up the hub cap, and Fig. 3 is a similar view showing the parts after the hub cap has been screwed up tight.

In the drawings, the same reference numerals indicate the same parts throughout the several views, and the sectional view is taken looking in the direction of the arrows at the ends of the section line.

In general, my invention consists in coupling the demountable wheel disc of a disc wheel to the hub by a clutch formed by a clamping flange or surface on the hub, the central portion of the wheel disc, a suitably dished locking ring and the hub cap or nut. The central portion of the disc is dished so that, when the hub cap is screwed up, it is flattened out and thus placed under stress, and the peripheral portion of the locking ring is also dished so that it acts like a spring washer when the nut is tightened. I so form the locking ring that it engages the disc in two spaced central zones, one near the central opening in the disc and the other intermediate the zones of contact of the unstressed disc with the clamping surface on the hub. This gives a clamping action exerted over a comparatively broad zone or area of the wheel disc, with the result that the disc is fastened to the hub in a manner particularly effective against side strains on the wheel.

Referring to the numbered parts of the drawings, in which I have illustrated a demountable disc wheel for automobiles, constituting one specific embodiment of my invention, the wheel includes a hub, 10, which, in the case of a rear wheel, is secured to the drive-shaft, 9, in the usual manner, and has the radially-extending clamping flange, 11. The body or barrel, 12, of the hub, is cylindrical in form and externally threaded and the outer end of said hub body is provided with a recess, 13, which receives the nut, 14, for securing the hub to the drive shaft. A wheel disc, 15, is demountably secured to said hub and has a peripheral flange, 16, to which is secured a rim, 17, for carrying the tire.

My invention has to do with the means for demountably securing the wheel disc to the hub, which means, in this embodiment, are as follows. The wheel disc, 15, has a central opening formed therein of such diameter as to slip over the cylindrical hub body, 12, so that the central portion of the wheel disc may come into contact with the outer face of the flange, 11, as appears in the drawings. The central portion of the wheel disc, 15, is dished somewhat so that, in its normal unstressed state, the wheel disc contacts with the clamping flange, 11, at two spaced circles or annular zones, one, at 18, near the periphery of the flange, 11, and the other, at 20, near the base of said flange. The portion, 19, of the wheel disc between said lines or zones of contact is normally spaced from the flange, being bowed away therefrom, as shown in Fig. 2. A clamping ring, 21, slips over the cylindrical hub body, 12, in front of the wheel disc, 15, and the outer peripheral portion of such clamping ring is dished, at 22, and contacts with the wheel disc, 15, at a circle or annular zone of contact, 23, which is intermediate the zones of contact of the unstressed disc with the clamping flange, 11. A nut or hub cap, 24, is screwed on the externally-threaded end of the hub body, 12, and the face, 25, of the hub cap engages the clamping ring, 21, and forces it toward the clamping flange, 11, so as to stress the central portion of the disc and the peripheral portion of the clamping ring and connect the disc, 15, with the hub, 10, in a very efficient clutch connection through the coaction of these parts, when under the stress imposed by screwing up the hub cap, 24.

In Fig. 2, we have shown the parts in their normal unstressed state, with the hub cap, 24, backed off sufficiently to remove all stress from the disc and the clamping ring. When the hub cap, 24, is screwed up into locking position, the parts assume the position shown in Fig. 3. It will be seen that the central bowed portion, 19, of the wheel disc is flattened out so as to engage the entire surface of the clamping flange, 11, thus putting this central portion of the disc under tension. The dished peripheral portion, 22, of the clamping ring, 21, is of such thickness and material that it will yield and flatten out somewhat as the hub cap is screwed up, coming to the position shown in Fig. 3, so that said clamping ring acts as a spring washer. The central portion of the clamping ring, 21, comes into contact with the portion of the wheel disc, 15, immediately adjacent the central opening therein, after the peripheral portions of the clamping ring have been flattened out somewhat by the screwing up of the hub cap and, when the hub cap is screwed home to its final position, the central portion of the wheel disc, 15, is clamped against the surface of the flange, 11, by the engagement of the clamping ring at two spaced zones or annular circles of contact, one near the base of the flange, 11, and the other near the periphery thereof, as appears in Fig. 3. This means that the central portion of the disc, 15, is effectively clamped against the clamping flange, 11, throughout its area, so that there is a clamping action over a comparatively broad zone resisting any leverage produced by side-thrusts acting against the rim of the wheel. When the central portion of the disc is flattened out by the locking ring, the edge of the central opening in the disc contracts so as to bind on the cylindrical hub body, 12, and this aids in connecting the disk and hub.

In case the hub cap, 24, should not be screwed up tight enough to clutch the parts together firmly, the result would be that the disc, 15, would tend to rotate on the hub, 10, and I propose to make the external thread on the hub body, 12, of such a hand that any slipping movement of this kind of the disc wheel on the hub, due to the frictional engagement of the clamping ring, 21, with the disc, 15, and the hub cap, 24, with the clamping ring, will tend to screw up the hub cap, 24, so as to tighten and make more perfect the clutch connection between the parts. To accomplish this purpose, in the case of a rear wheel a right-hand thread should be provided on the hub intended for the left-hand side of the automobile and a left-hand thread on the hub intended for the right-hand side of the automobile. Of course, when backing, the tendency would be for slippage of the disc to cause the hub cap to unscrew, with this arrangement of threads, but, since by far the greater part of the running of the automobile is in the forward direction, this action so far outbalances the reverse action that the latter is negligible.

It will be evident that my improved construction for detachably securing a demountable disc wheel to the hub is very simple and composed of but few parts, all of which may be very readily manufactured. This makes this wheel construction very inexpensive to produce but, nevertheless, it is highly efficient and effective, inasmuch as these parts form a clutch connection which securely grips and clamps the wheel disc to the hub. The disc may be demounted by the simple act of unscrewing the hub cap and removing the clamping ring. The fact that the central portion of the disc and the clamping ring are dished, whereby these parts are deformed when the hub cap is screwed up and are, consequently, under stress, causes them to act like a spring washer upon the hub cap to prevent it from working loose so that no locking device is necessary to retain the hub cap in position.

I am aware that the particular wheel construction disclosed in this specification may be changed considerably without departing from the spirit of my invention and, therefore, I claim my invention broadly, as indicated by the appended claims.

Having thus described my invention, what I claim as new and useful and of my own invention, and desire to secure by Letters Patent is:

1. A demountable wheel construction comprising a hub having a clamping flange, a demountable wheel disc adapted to carry a rim and tire and having a central opening through which the body of the hub extends, the portion of said disc adjacent the central opening contacting with said clamping flange, a clamping ring having a yielding periphery mounted on the body of the hub in clamping engagement with the central portion of said disc in two spaced annular zones of contact only, one near the base of said flange and the other near the periphery thereof, and a hub cap screwed on the body of said hub and engaging the clamping ring to maintain it in clamping engagement.

2. A demountable wheel construction comprising a hub having a clamping flange, a demountable wheel disc adapted to carry a rim and tire and having a central opening through which the body of the hub extends, the portion of said disc adjacent the central opening contacting with the flange, a dished clamping ring having a yielding peripheral portion resiliently engaging the disc in an annular zone of contact adjacent the periphery of said flange and a central portion rigidly engaging the disc in an annular zone of contact adjacent the base of said flange, said ring being spaced from the disc between said annular zones of contact, and means for maintaining said ring in clamping engagement with the disc.

3. A demountable wheel construction comprising a hub having a clamping flange, a demountable wheel disc adapted to carry a rim and tire and having a central opening through which the body of the hub extends, the portion of said disc adjacent said central opening being dished to contact, in its unstressed state, with said flange in two spaced annular zones of contact, one near the periphery and the other near the base of said flange, a clamping ring mounted on the body of the hub and held in clamping engagement with said disc in two annular zones of contact, one near the base and the other near the periphery of said flange, and means for maintaining said clamping ring in locking engagement with the disc.

4. A demountable wheel construction comprising a hub having a clamping flange, a demountable wheel disc adapted to carry a rim and tire and having a central opening through which the body of the hub extends, the portion of said disc adjacent said central opening being dished to contact, in its unstressed state, with said flange in two spaced annular zones of contact, one near the periphery and the other near the base of said flange, a clamping ring mounted on the hub flange and dished, whereby the peripheral portion of said clamping ring first engages the disc at points near the periphery of said flange and yields, when stress is placed upon the ring, to permit the central portion of said ring to engage and clamp the disc adjacent the base of said flange, and means for maintaining said clamping ring in clamping engagement with the disc.

5. A demountable wheel construction comprising a hub having a clamping flange, a demountable wheel disc adapted to carry a rim and tire and having a central opening through which the body of the hub extends, the portion of said disc adjacent said central opening being dished to contact, in its unstressed state, with said flange in two spaced annular zones of contact, one near the periphery and the other near the base of said flange, a clamping ring mounted on the hub, said ring resiliently engaging the disc at points near the periphery of the flange and rigidly engaging the disc at points near the base of said flange, and means for maintaining said ring in clamping engagement with the disc.

6. A demountable wheel construction comprising a hub having a clamping flange, a demountable wheel disc adapted to carry a rim and tire and having a central opening through which the body of the hub extends, the portion of said disc adjacent said central opening being dished to contact, when unstressed, with said flange in two spaced annular zones of contact, one near the periphery of the flange and the other near the central opening of the disc, a clamping ring mounted on the hub and having a dished peripheral portion contacting with the disc adjacent the line of contact of the latter with the periphery of said flange and a central portion engaging the portion of the disc adjacent the central opening therein to stress the central portion of the disc and clamp it against the flange, and a nut screwed on the body of the hub and engaging said clamping ring.

In testimony whereof, I affix my signature.

EARL J. W. RAGSDALE.